(12) United States Patent
Zhou et al.

(10) Patent No.: US 10,831,993 B2
(45) Date of Patent: Nov. 10, 2020

(54) METHOD AND APPARATUS FOR CONSTRUCTING BINARY FEATURE DICTIONARY

(71) Applicant: BEIJING BAIDU NETCOM SCIENCE AND TECHNOLOGY CO., LTD., Beijing (CN)

(72) Inventors: Kunsheng Zhou, Beijing (CN); Jingzhou He, Beijing (CN); Lei Shi, Beijing (CN); Shikun Feng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 90 days.

(21) Appl. No.: 16/306,488

(22) PCT Filed: Dec. 22, 2016

(86) PCT No.: PCT/CN2016/111571
§ 371 (c)(1),
(2) Date: Nov. 30, 2018

(87) PCT Pub. No.: WO2017/206492
PCT Pub. Date: Dec. 7, 2017

(65) Prior Publication Data
US 2019/0163737 A1    May 30, 2019

(30) Foreign Application Priority Data
May 31, 2016 (CN) .......................... 2016 1 0379719

(51) Int. Cl.
*G06F 40/242* (2020.01)
*G06F 16/00* (2019.01)
(Continued)

(52) U.S. Cl.
CPC ............ *G06F 40/242* (2020.01); *G06F 16/00* (2019.01); *G06F 17/18* (2013.01); *G06F 40/20* (2020.01);
(Continued)

(58) Field of Classification Search
CPC ........ G06F 40/30; G06F 40/284; G06F 40/20; G06F 40/242; G06N 3/02
See application file for complete search history.

(56) References Cited

U.S. PATENT DOCUMENTS 6,173,298 B1 * 1/2001 Smadja ................. G06F 16/374
715/209
7,555,523 B1 * 6/2009 Hartmann ............... H04L 51/12
709/206
(Continued)

FOREIGN PATENT DOCUMENTS

| CN | 104375989 A | 2/2015 |
| CN | 104391963 A | 3/2015 |

(Continued)

OTHER PUBLICATIONS

Kwong et al. "Automatic Corpus-Based Extraction of Chinese Legal Terms." NLPRS. (Year: 2001).*
(Continued)

*Primary Examiner* — Samuel G Neway
(74) *Attorney, Agent, or Firm* — Lathrop GPM LLP

(57) ABSTRACT

Disclosed are a method and an apparatus for constructing a binary feature dictionary. The method may include: extracting binary features from a corpus; calculating a preset statistic of each binary feature; and selecting a preset number of binary features in sequence according to the preset statistic to constitute the binary feature dictionary.

9 Claims, 4 Drawing Sheets

(51) Int. Cl.
*G06F 40/30* (2020.01)
*G06N 3/02* (2006.01)
*G06F 40/20* (2020.01)
*G06F 40/284* (2020.01)
*G06F 17/18* (2006.01)
*G06N 3/08* (2006.01)

(52) U.S. Cl.
CPC ............ *G06F 40/284* (2020.01); *G06F 40/30* (2020.01); *G06N 3/02* (2013.01); *G06N 3/08* (2013.01)

(56) References Cited

U.S. PATENT DOCUMENTS

| | | | |
|---|---|---|---|
| 9,659,248 B1* | 5/2017 | Barbosa | G06F 40/40 |
| 2011/0035211 A1* | 2/2011 | Eden | G06F 16/313 |
| | | | 704/10 |
| 2015/0100308 A1* | 4/2015 | Bedrax-Weiss | G06F 40/242 |
| | | | 704/10 |
| 2016/0350655 A1* | 12/2016 | Weiss | G06F 40/35 |
| 2017/0085509 A1* | 3/2017 | Fernandez | H04L 67/26 |
| 2017/0235721 A1* | 8/2017 | Almosallam | G06F 40/232 |
| | | | 704/9 |
| 2019/0163737 A1* | 5/2019 | Zhou | G06F 17/18 |

FOREIGN PATENT DOCUMENTS

| | | |
|---|---|---|
| CN | 104899190 A | 9/2015 |
| CN | 105488077 A | 4/2016 |
| CN | 106021572 A | 10/2016 |

OTHER PUBLICATIONS

PCT/CN2016/111571 English translation of International Search Report dated Mar. 31, 2017, 2 pages.
PCT/CN2016/111571 International Search Report and Written Opinion dated Mar. 31, 2017, 13 pages.
Chinese Patent Application No. 201610379719.X, English translation of Second Office Action dated Jun. 5, 2018, 5 pages.
Chinese Patent Application No. 201610379719.X, Second Office Action dated Jun. 5, 2018, 5 pages.
Chinese Patent Application No. 201610379719.X, English translation of First Office Action dated Aug. 21, 2017, 5 pages.
Chinese Patent Application No. 201610379719.X, First Office Action dated Aug. 21, 2017, 5 pages.

* cited by examiner

METHOD AND APPARATUS FOR CONSTRUCTING BINARY FEATURE DICTIONARY

CROSS REFERENCE TO RELATED APPLICATION

This application is a US national phase application of International Application No. PCT/CN2016/111571, filed on Dec. 22, 2016, which claims priority to Chinese Patent Application Serial No. 201610379719.X, filed on May 31, 2016 by BEIJING BAIDU NETCOM SCIENCE AND TECHNOLOGY CO., LTD., entitled "Binary Feature Dictionary Construction Method and Apparatus".

FIELD

The present disclosure relates to a field of natural language processing technology, and particularly, to a method and an apparatus for constructing a binary feature dictionary.

BACKGROUND

A search engine is a retrieval system being able to feed results back to the user. An implementation of the search engine is based on a semantic similarity model. The semantic similarity model may be used to calculate a similarity between a query searched by the user and a candidate title, and to sort according to the similarity to return search results. The semantic similarity model may be constructed using a neural network training.

In the related art, when a semantic similarity model is constructed by using a neural network, training data may usually be information of a basic granularity or information of a phrase granularity, in which the information of the basic granularity is a word segment with the minimum granularity obtained after a segmentation is performed on a sentence corpus, such as "Baidu", the information of the phrase granular includes multiple word segments with the minimum granularity, such as "Brazil Portuguese". In order to improve the accuracy of the semantic similarity model, new granularity information may also be introduced in the training data. When the new granular information is required to be introduced, it is necessary to solve the problem of how to extract the new granular information.

SUMMARY

Embodiments of the present disclosure seek to solve one of the problems existing in the related art to at least some extent.

Embodiments of the present disclosure provide a method for constructing a binary feature dictionary. The method may include: extracting binary features from a corpus; calculating a preset statistic of each binary feature; and selecting a preset number of binary features in sequence according to the preset statistic to constitute the binary feature dictionary.

Embodiments of the present disclosure provides an apparatus for constructing a binary feature dictionary. The apparatus may include: one or more processors; a memory storing instructions executable by the one or more processors; in which the one or more processors are configured to: extract binary features from a corpus; calculate a preset statistic of each binary feature; and select a preset number of binary features in sequence according to the preset statistic to constitute the binary feature dictionary.

Embodiments of the present disclosure provide a non-transitory computer readable storage medium, in which when instructions in the storage medium are executed by a processor of a terminal, the terminal is caused to perform a method, the method may include: extracting binary features from a corpus; calculating a preset statistic of each binary feature; and selecting a preset number of binary features in sequence according to the preset statistic to constitute the binary feature dictionary.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of the present disclosure will become apparent and readily understood from following descriptions with reference to the drawings, in which.

DETAILED DESCRIPTION

Figure 1:
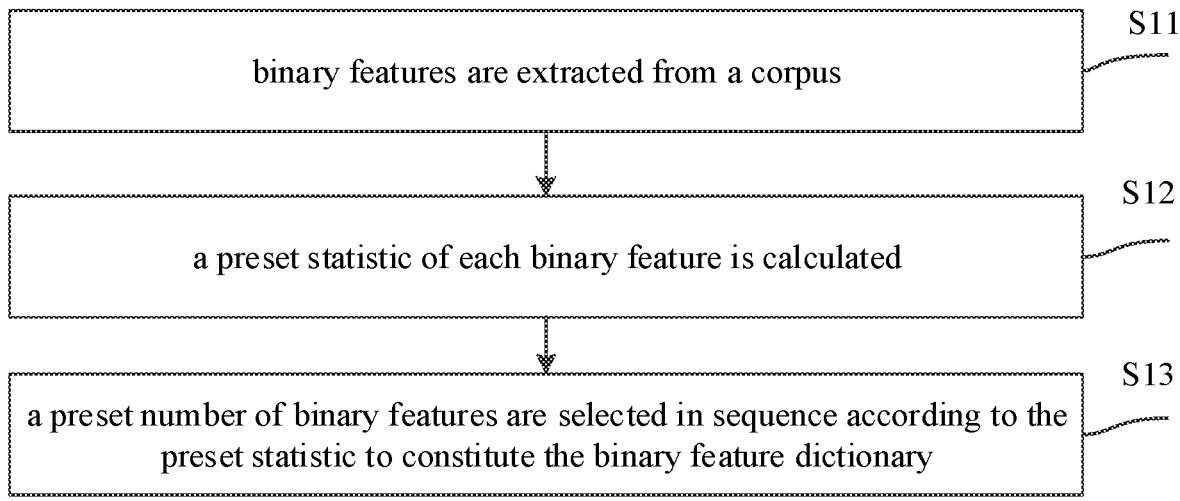
FIG. 1 is a schematic flow chart of a method for constructing a binary feature dictionary according to an embodiment of the present disclosure.

The embodiments of the present application are described in detail below, and the examples of the embodiments are illustrated in the accompanying drawings, in which the same or similar reference numerals indicate the same or similar modules or modules having the same or similar functions. The embodiments described below with reference to the accompanying drawings are intended to be illustrative only, and are not to be construed as limiting. Rather, the embodiment of the present application includes all changes, modifications, and equivalents falling within the spirit and scope of the appended claims.

When obtaining training data of a semantic similarity model, a segmentation may be performed on a sentence corpus firstly, and then information of a granularity which is required, such as information of a basic granularity or information of a phrase granularity, may be obtained according to word segments.

As shown above, when constructing the semantic similarity model, in addition to the information of the basic granularity or the information of the phrase granularity described above, new granularity information may be introduced. The introduced new granularity information of may be referred to as a binary feature. Each binary feature consists of two pieces of information of the basic granularity or two pieces of information of the phrase granularity.

When the binary feature needs to be introduced, the corresponding binary feature may be obtained according to a binary feature dictionary. Therefore, there is a need to solve the problem of how to build the binary feature dictionary.

FIG. 1 is a schematic flow chart of a method for constructing a binary feature dictionary according to an embodiment of the present disclosure.

As shown in FIG. 1, a process of this embodiment includes followings.

At block S11, binary features are extracted from a corpus.

When constructing the binary feature dictionary, the corpus may be collected firstly. Similar to the construction of the semantic similarity model, the corpus collected when constructing the binary feature dictionary may also be a sentence corpus. In other words, a large number of sentences are collected as the corpus.

When extracting binary features from the corpus, it is possible to specifically determine any two adjacent terms in the corpus as a binary feature.

Specifically, for each sentence corpus, the sentence corpus can be segmented to obtain a term.

The term may be with a basic granularity or a phrase granularity. However, the above two terms need to have the same granularity. For example, the two terms both have the basic granularity or both have the phrase granularity. The sentence may be segmented into terms with the basic granularity or terms with the phrase granularity by applying various known arts, which will not be described in detail herein.

After the sentence is segmented into terms, any two adjacent terms may be regarded as a binary feature. Therefore, for each sentence, assume that the sentence includes n terms, (n−1) binary features may be extracted. After adding the binary features corresponding to all sentences in the corpus, multiple binary features may be obtained.

At block S12, a preset statistic of each binary feature is calculated.

In this embodiment, for example, the preset statistic is T-statistic.

T-statistic is a statistic that tests a single hypothesis of model parameters.

Specifically, the formula for calculating T-statistic of a binary feature is described as follows.

$$t = \frac{f - \mu}{\sqrt{s^2/N}}$$

where f is a probability of the binary feature existing in the corpus. For example, there are M sentences in the corpus, in which the binary feature exists in m sentences, that is, two terms in the binary feature of which are the positions are adjacent and not changed will exist in m sentences, and f=m/M;

$\mu = p_1 \times p_2$, $p_1$ is a probability of a term in the binary feature existing in the corpus, and $p_2$ is a probability of another term in the binary feature existing in the corpus;

in this embodiment, it is assumed that $s^2 = f$;

N is the total number of all binary features in the corpus, $N = \Sigma N_i$, where N is the number of the binary features corresponding to a single sentence corpus. Assume that a certain sentence corpus includes n terms, the number of the binary features corresponding to this sentence corpus is (n−1).

Therefore, with the above calculation formula, T-statistic of each binary feature may be calculated.

At block S13, a preset number of binary features are selected in sequence according to the preset statistic to constitute the binary feature dictionary.

For example, after T-statistic of each binary feature is obtained, a preset number of binary features may be selected according to T-statistic in a descending order, and the selected binary features constitute the binary feature dictionary.

Further, as shown above, a binary feature may be composed of two terms with basic granularity, or a binary feature may be composed of two terms with phrase granularity. When performing the sorting described above, the binary features (including the binary features obtained according to the terms with the basic granularity and the binary features obtained according to the terms with the phrase granularity) are uniformly sorted. Therefore, the binary features obtained according to the terms with the basic granularity and the binary features obtained according to the terms with the phrase granularity are included in the binary feature dictionary.

By the above process, the construction of the binary feature dictionary may be realized.

After the binary feature dictionary is constructed, the dictionary may be used to generate the binary features for training in the semantic similarity model.

Figure 2:
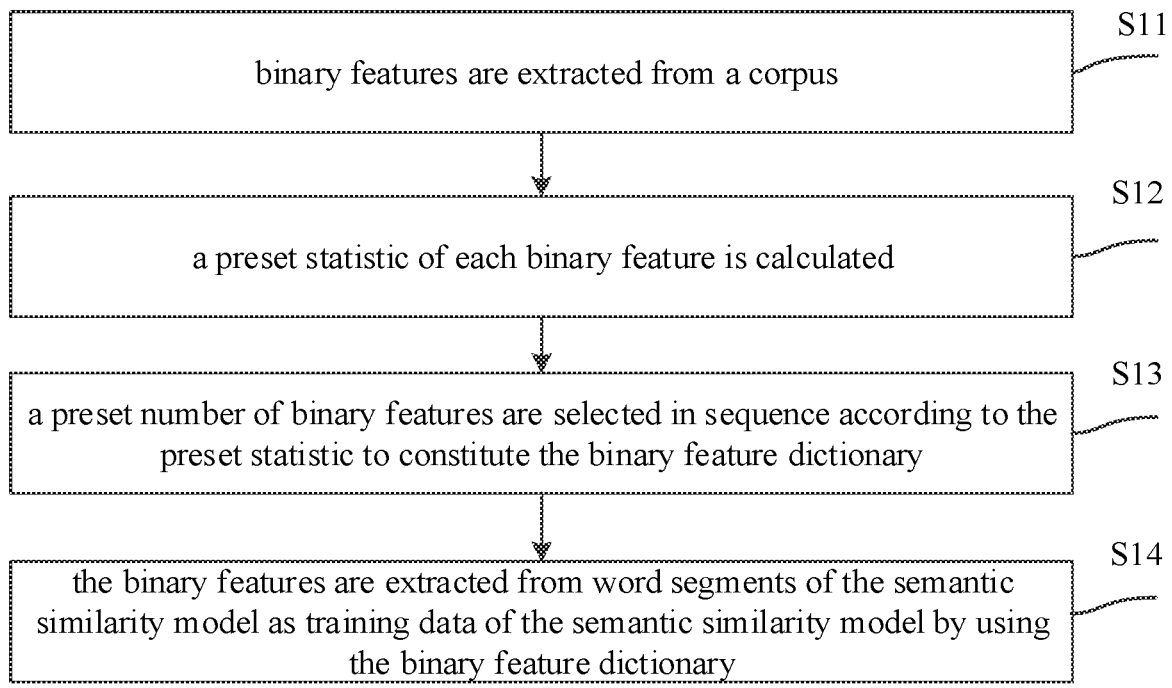
FIG. 2 is a schematic flow chart of a method for constructing a binary feature dictionary according to another embodiment of the present disclosure.

Correspondingly, in some embodiments, referring to FIG. 2, the method in this embodiment may further include followings.

At block S14, the binary features are extracted from word segments of the semantic similarity model as training data of the semantic similarity model by using the binary feature dictionary.

The binary feature included in the binary feature dictionary and composed of two adjacent segments may be determined as the extracted binary feature.

In addition, the above-mentioned segments may be segments with the basic granularity or segments with the phrase granularity.

For example, a corpus of the semantic similarity module is "Baidu Brazilian Portuguese". After the segmentation is performed, taking the segments with the basic granularity as an example, the segments are "Baidu", "Brazil", "Portuguese", and one of the binary features in the constructed binary feature dictionary is "Brazil Portuguese", the binary feature extracted is "Brazil Portuguese".

Further, if the binary feature dictionary does not include the binary features composed of any two adjacent segments, the segments are directly regarded as the extracted binary feature. Still taking the above corpus as an example, assume that the constructed binary feature dictionary does not include "Brazil Portuguese" nor "Baidu Brazil", the extracted binary features are the original segments, such as "Baidu", "Brazil", "Portuguese".

Therefore, by using the binary feature dictionary, the extraction of the binary features may be realized, such that new features may be introduced when training the semantic similarity model.

Figure 3:
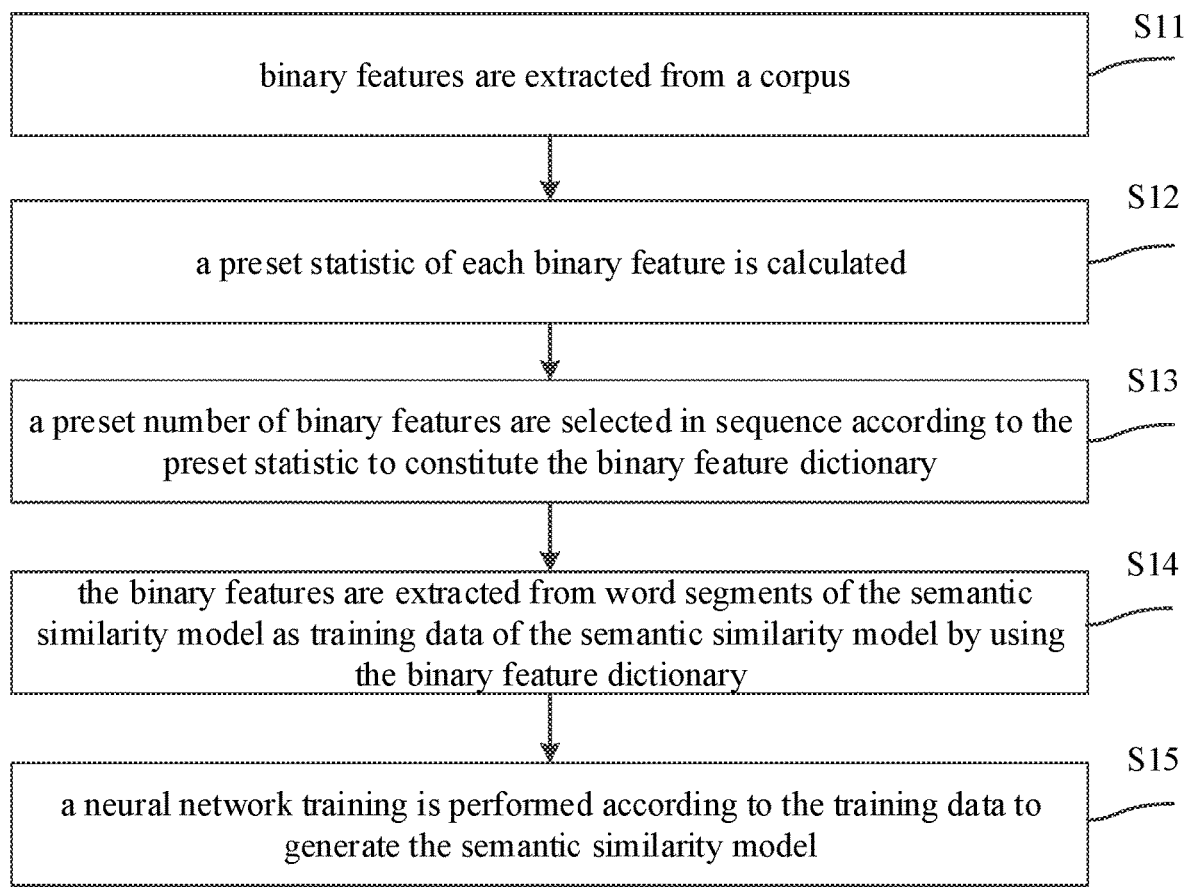
FIG. 3 is a schematic flow chart of a method for constructing a binary feature dictionary according to another embodiment of the present disclosure.

In some embodiments, referring to FIG. 3, the method of this embodiment may further include followings.

At block S15, a neural network training is performed according to the training data to generate the semantic similarity model.

Figure 4:
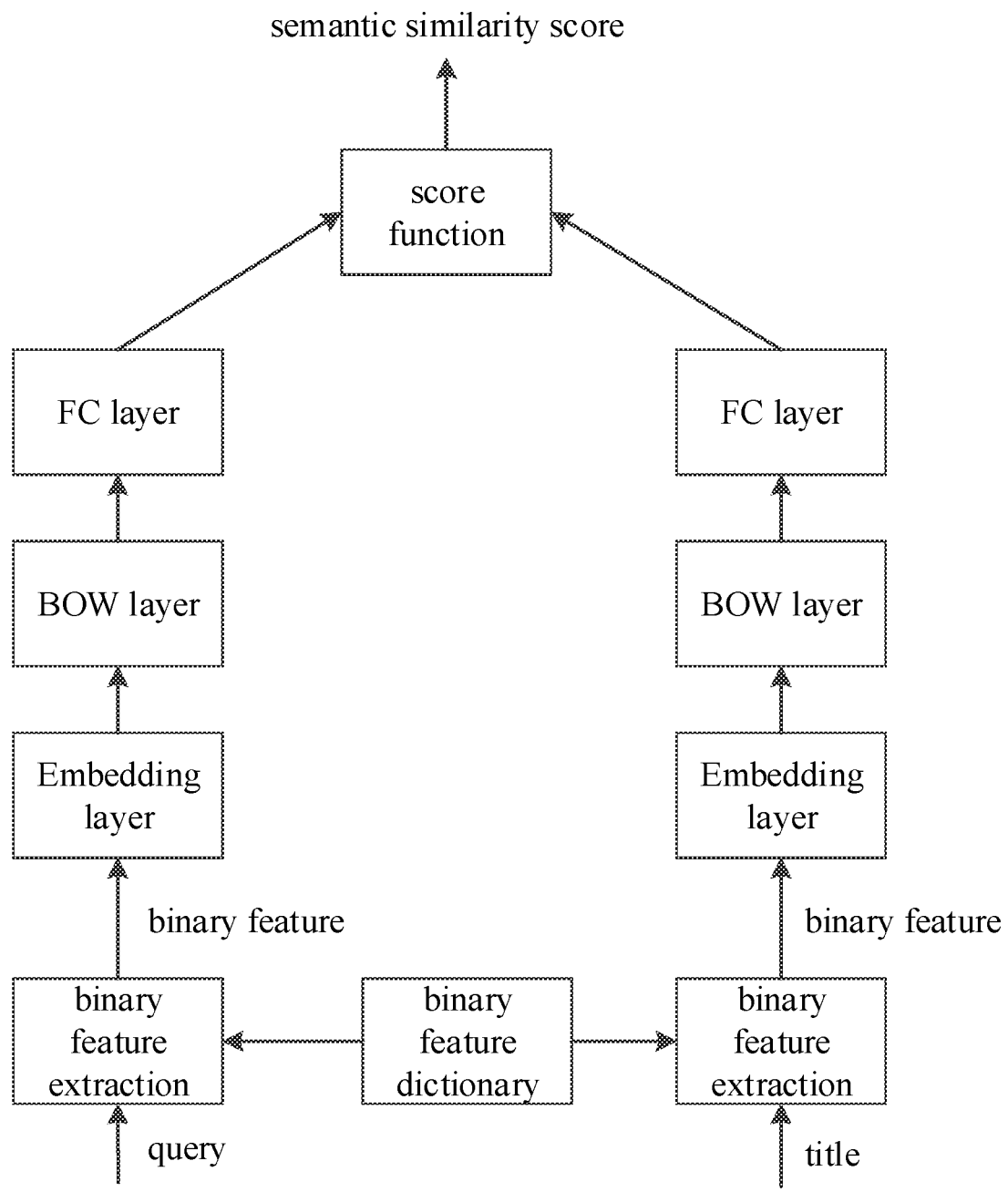
FIG. 4 is a schematic diagram of a neural network used in an embodiment of the present disclosure.

The neural network may be shown in FIG. 4. this embodiment is different from the usual semantic similarity model at that the input of this embodiment may include the binary features.

Therefore, the semantic similarity model may be trained by introducing the binary features.

In this embodiment, by calculating the preset statistic of each binary feature, and selecting binary features according to the preset statistic to constitute the binary feature dictionary, the construction of the binary feature dictionary may be realized, such that the binary feature dictionary may be used to extract binary features from the corpus. Further, the binary features may be used as new features introduced into the training data of the semantic similarity model.

Figure 5:
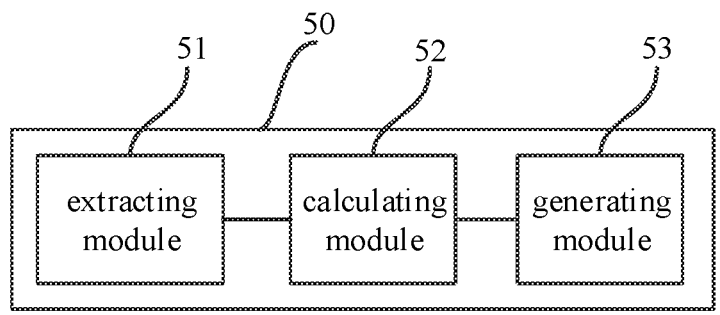
FIG. 5 is a schematic structural diagram of an apparatus for constructing a binary feature dictionary according to an embodiment of the present disclosure.

FIG. 5 is a schematic structural diagram of an apparatus for constructing a binary feature dictionary according to an embodiment of the present disclosure.

Referring to FIG. 5, the apparatus of this embodiment may include an extracting module 51, a calculating module 52 and a generating module 53.

The extracting module 51 is configured to extract binary features from a corpus.

The calculation module 52 is configured to calculate a preset statistic of each binary feature.

The generating module 53 is configured to select a preset number of binary features in sequence according to the preset statistic to constitute the binary feature dictionary.

In some embodiments, the extracting module 51 is specifically configured to determine two adjacent terms in the corpus as a binary feature.

In some embodiments, the preset statistic calculated by the calculating module 52 is T-statistic.

Figure 6:
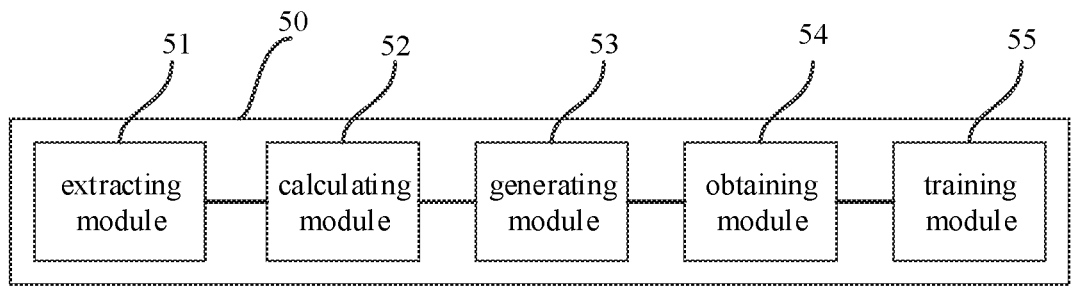
FIG. 6 is a schematic structural diagram of an apparatus for constructing a binary feature dictionary according to an embodiment of the present disclosure.

In some embodiments, referring to FIG. 6, the apparatus of this embodiment may further include an obtaining module 54.

The obtaining module 54 is configured to extract the binary features from word segments of a semantic similarity model as training data of the semantic similarity model by using the binary feature dictionary.

In some embodiments, referring to FIG. 6, the apparatus of this embodiment may further include a training module 55.

The training module 55 is configured to perform a neural network training according to the training data to generate the semantic similarity model.

It may be understood that, the apparatus of this embodiment corresponds to the method embodiment. The details may refer to the related description in the method embodiment, which will not be described in detail herein.

In this embodiment, by calculating the preset statistic of each binary feature, and selecting binary features according to the preset statistic to constitute the binary feature dictionary, the construction of the binary feature dictionary may be realized, such that the binary feature dictionary may be used to extract binary features from the corpus. Further, the binary features may be used as new features introduced into the training data of the semantic similarity model.

It may be understood that, the same or similar parts in the above embodiments may be referred to each other. Those not described in detail in some embodiments may refer to the same or similar contents in other embodiments.

Embodiments of the present disclosure provide a terminal, including: a processor; a memory for storing processor-executable instructions; in which the processor is configured to: extract binary features from a corpus; calculate a preset statistic of each binary feature; and select a preset number of binary features in sequence according to the preset statistic to constitute a binary feature dictionary.

Embodiments of the present disclosure provide a non-transitory computer readable storage medium, when instructions in the storage medium are executed by a processor of a terminal, the processor is caused to perform a method, the method includes: extracting binary features from a corpus; calculating a preset statistic of each binary feature; and selecting a preset number of binary features in sequence according to the preset statistic to constitute a binary feature dictionary.

Embodiments of the present disclosure provide a computer program product, in which when instructions in the computer program product is executed by a processor, the computer program product is caused to perform a method, the method includes: extracting binary features from a corpus; calculating a preset statistic of each binary feature; and selecting a preset number of binary features in sequence according to the preset statistic to constitute a binary feature dictionary.

It should be noted that in the description of the present application, the terms "first", "second" and the like are used for descriptive purposes only and are not to be construed as indicating or implying relative importance. Further, in the description of the present application, the meaning of "a plurality of" means at least two unless otherwise stated.

Any process or method description in the flowcharts or otherwise described herein may be understood as a module, segment or portion of code representing executable instructions including one or more steps for implementing a particular logical function or process. The scope of the preferred embodiments of the present disclosure includes additional implementations, in which the functions may be performed not in the order shown or discussed, including in a substantially simultaneous manner or in the reverse order depending on the functions involved, which should be understood by those skilled in the art to which the embodiments of the present application pertain.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for constructing a binary feature dictionary, comprising:
   extracting binary features from a corpus;
   calculating a preset statistic of each of the binary features; and
   selecting a preset number of the binary features in sequence according to the preset statistic to constitute the binary feature dictionary;
   extracting the selected binary features included in the binary feature dictionary from word segments of a semantic similarity model as training data of the semantic similarity model; and
   performing a neural network training according to the training data to generate the semantic similarity model.

2. The method according to claim 1, wherein extracting the binary features from the corpus comprises:
   determining two adjacent terms in the corpus as a binary feature.

3. The method according to claim 1, wherein the preset statistic is T-statistic.

4. An apparatus for constructing a binary feature dictionary, comprising:
   one or more processors;
   a memory storing instructions that, when executed by the one or more processors, cause the one or more processors to:
   extract binary features from a corpus;
   calculate a preset statistic of each of the binary features;
   select a preset number of the binary features in sequence according to the preset statistic to constitute the binary feature dictionary;
   extract the selected binary features included in the binary feature dictionary from word segments of a semantic similarity model as training data of the semantic similarity model; and
   perform a neural network training according to the training data to generate the semantic similarity model.

5. The apparatus according to claim 4, wherein the one or more processors extract binary features from the corpus by performing act of:
   determining two adjacent terms in the corpus as a binary feature.

6. The apparatus according to claim 4, wherein the preset statistic calculated by the one or more processors is T-statistic.

7. A non-transitory computer readable storage medium, wherein when instructions in the storage medium are executed by a processor of a terminal, the terminal is caused to perform a method, the method comprises:
   extracting binary features from a corpus;
   calculating a preset statistic of each of the binary features;
   selecting a preset number of the binary features in sequence according to the preset statistic to constitute a binary feature dictionary;
   extracting the selected binary features included in the binary feature dictionary from word segments of a semantic similarity model as training data of the semantic similarity model; and
   performing a neural network training according to the training data to generate the semantic similarity model.

8. The method according to claim 2, wherein the preset statistic is T-statistic.

9. The apparatus according to claim 5, wherein the preset statistic calculated by the one or more processors is T-statistic.

* * * * *